US006424060B1

(12) United States Patent
Shiely et al.

(10) Patent No.: US 6,424,060 B1
(45) Date of Patent: Jul. 23, 2002

(54) POWER TRANSFER SYSTEM HAVING A LOCKOUT PLATE

(75) Inventors: Vincent Shiely, Brookfield; Michael Plutte, Oak Creek; Thomas J. Green, West Bend; Robert Traska, Cedarburg, all of WI (US)

(73) Assignee: Generac Portable Products, Inc., Jefferson, WI (US)

( * ) Notice: Subject to any disclaimer, the term of this patent is extended or adjusted under 35 U.S.C. 154(b) by 110 days.

(21) Appl. No.: 09/633,253

(22) Filed: Aug. 7, 2000

(51) Int. Cl.⁷ .................................................. H02H 1/04

(52) U.S. Cl. ....................................... 307/328; 307/115

(58) Field of Search ................................ 307/328, 115, 307/125; 200/43.01, 43.04, 43.16, 43.19, 43.21, 50.35

(56) References Cited

U.S. PATENT DOCUMENTS

| | | | | | |
|---|---|---|---|---|---|
| 3,647,997 | A | | 3/1972 | Nerem | |
| 3,705,280 | A | | 12/1972 | Harms | |
| 3,778,633 | A | | 12/1973 | DeVisser et al. | |
| 3,801,758 | A | | 4/1974 | Shand et al. | |
| 4,510,357 | A | | 4/1985 | Winterbottom | |
| 4,760,278 | A | | 7/1988 | Thomson | |
| 4,924,041 | A | * | 5/1990 | Yee | 200/50.33 |
| 5,008,499 | A | | 4/1991 | Yee et al. | |
| 5,227,952 | A | | 7/1993 | Romano et al. | |
| 5,310,969 | A | * | 5/1994 | Turek et al. | 200/43.14 |
| 5,543,593 | A | * | 8/1996 | Turek | 200/43.11 |
| 5,648,646 | A | | 7/1997 | Flegel | |
| 5,761,027 | A | | 6/1998 | Flegel | |
| 5,895,981 | A | | 4/1999 | Flegel | |
| 5,902,974 | A | | 5/1999 | Fogle et al. | |
| 6,031,193 | A | * | 2/2000 | Flegel | 200/50.33 |
| 6,137,070 | A | * | 10/2000 | Montague et al. | 200/50.33 |
| 6,180,897 | B1 | * | 1/2001 | Montague et al. | 200/50.33 |
| 6,184,482 | B1 | * | 2/2001 | Priem | 200/43.16 |
| 6,184,595 | B1 | * | 2/2001 | Flegel, Jr. | 307/114 |

OTHER PUBLICATIONS

Gen Tran Corporation Gen/Tran Installation and Operating Instructions 1999 Publ. in United States.

Dayton Dayton Manual Transfer Switch Oct. 23, 1998 Rev. A Publ. in United States.

Generac Portable Products, LLC Portable Generator Power Transfer System with Load ManagerTM Owner's Manual Revision 0, Mar. 8, 1999 Publ. in United States.

* cited by examiner

*Primary Examiner*—Brian Sircus
*Assistant Examiner*—Sharon Polk
(74) *Attorney, Agent, or Firm*—Michael Best & Friedrich LLP

(57) ABSTRACT

A power transfer system for supplying electrical power to a plurality of load circuits, the system including a first input adapted to being electrically connected to a power source, and a first plurality of switches electrically connected to the first input, wherein each first switch has an ON state and an OFF state. The system also includes a second input adapted to being electrically connected to the plurality of load circuits, and a second plurality of switches electrically connected to the second input, wherein each of the second switches is associated with one of said first switches and is adapted to being associated with one of the load circuits, and wherein each of the second switches has an ON state and an OFF state. The system also includes a face plate through which each switch of the first and second pluralities of switches at least partially extends, and a movable lockout plate disposed behind the face plate that prevents the movement of a selected first or second switch from its OFF state to its ON state when the switch associated with said selected switch is in its ON state.

30 Claims, 7 Drawing Sheets

Fig. 9a
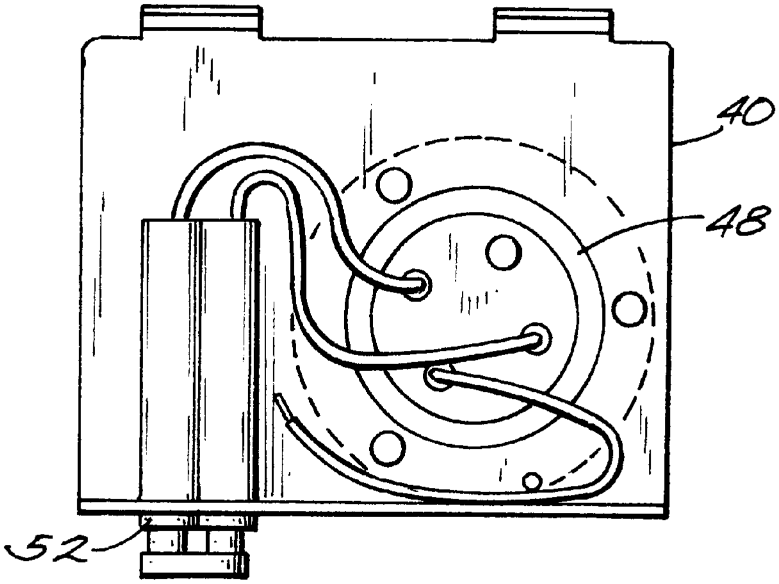
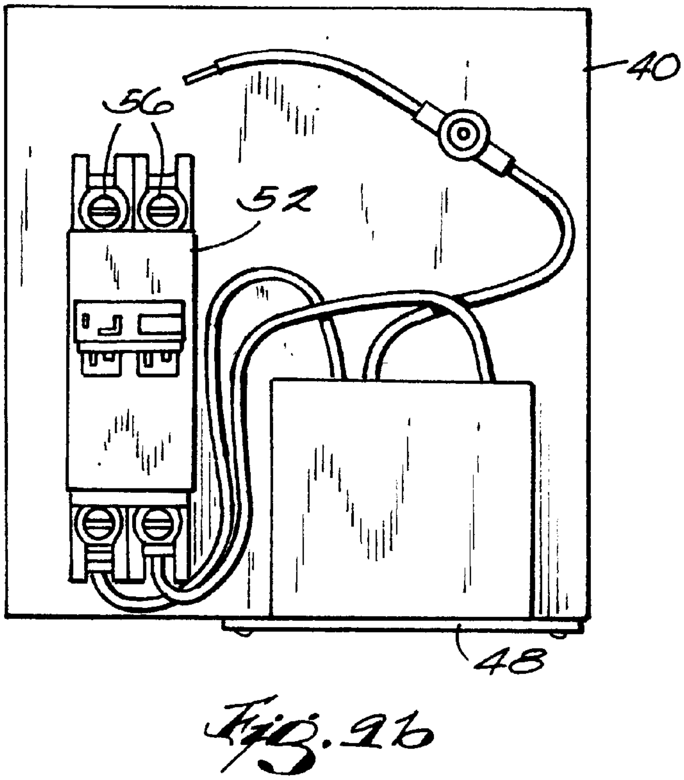
Fig. 9b

POWER TRANSFER SYSTEM HAVING A LOCKOUT PLATE

FIELD OF THE INVENTION

The invention relates to power transfer systems, specifically to systems for transferring power from a generator to power a building.

BACKGROUND OF THE INVENTION

In various applications, power switches need to be locked out such that electrical power is prevented from energizing equipment being worked on, or equipment being supplied with power from an alternate source. Prior art lockout devices include a pivoting lever lockout arm between two switches, a rigid connector between two switches, and various other mechanical blocks.

SUMMARY OF THE INVENTION

Prior art lockout devices tend to be complicated and expensive and, because most devices tend to operate on only one or a pair of switches, it is easy to overlook a lockout and leave an inappropriate switch energized. The invention provides a solution to the complication and individuality problems by providing a simple lockout plate that may simultaneously lock out all of a selected set of switches in a transfer device simultaneously.

More specifically, the invention defines a power transfer system for supplying electrical power to a plurality of load circuits, the system including a first input adapted to being electrically connected to a power source, and a first plurality of switches electrically connected to the first input, wherein each first switch has an ON state and an OFF state. The system also includes a second input adapted to being electrically connected to the plurality of load circuits, and a second plurality of switches electrically connected to the second input, wherein each of the second switches is associated with one of said first switches and is adapted to being associated with one of the load circuits, and wherein each of the second switches has an ON state and an OFF state. The system also includes a face plate through which each switch of the first and second pluralities of switches at least partially extends, and a movable lockout plate disposed behind the face plate that prevents the movement of a selected first or second switch from its OFF state to its ON state when the switch associated with said selected switch is in its ON state.

Other features and advantages of the invention will become apparent to those skilled in the art upon review of the following detailed description, claims, and drawings.

BRIEF DESCRIPTION OF THE DRAWINGS

FIG. 9*a* is a cutaway top view of an inlet box of the transfer system illustrated in FIG. 8.

FIG. 9*b* is a cutaway side view of the inlet box of the transfer system illustrated in FIG. 8.

Figure 1:
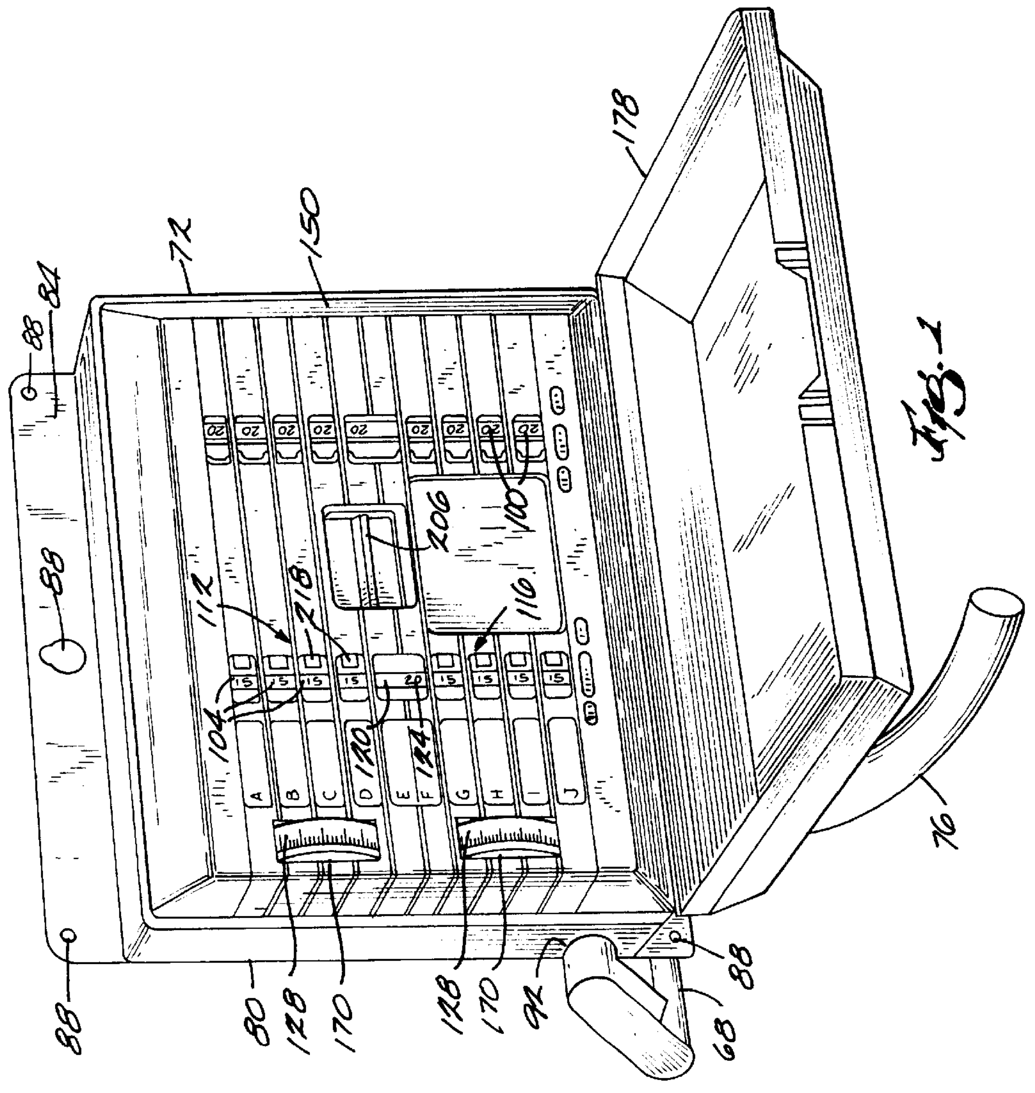
FIG. 1 is a perspective view of a transfer switch embodying the invention.
Figure 2:
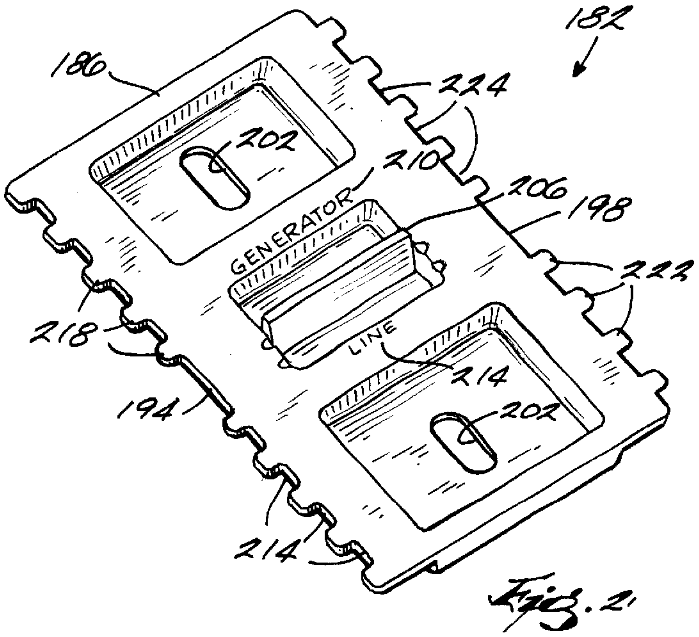
FIG. 2 is a perspective view of a lockout plate used in the transfer switch illustrated in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENTS

Figure 8:
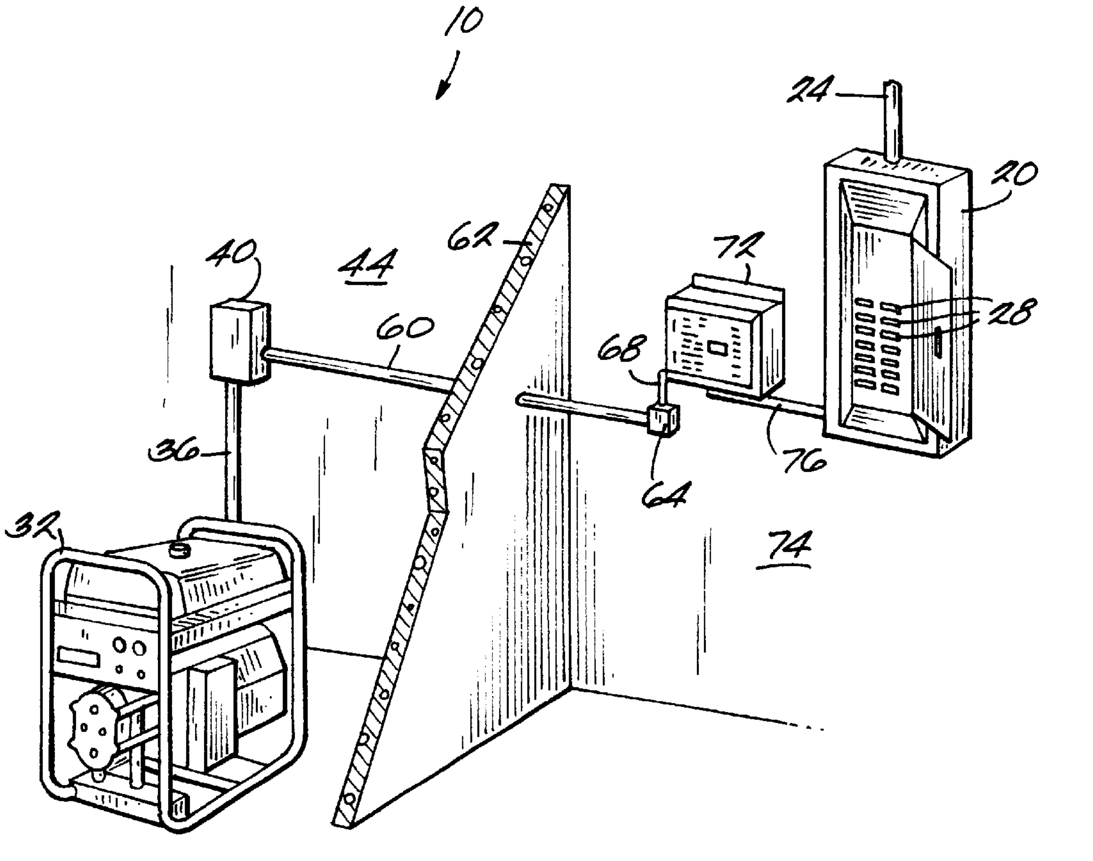
FIG. 8 is a perspective view of a power transfer system including the transfer switch illustrated in FIG. 1.

A power supply assembly 10 embodying the invention is illustrated in FIG. 8. The invention described herein may be used in any type of power transfer system. An application of the invention in a residential power system is illustrated for exemplary purposes, although the invention may be used in other types of buildings.

FIG. 8 illustrates a residential load center or breaker box 20 capable of being supplied from alternate sources of electrical power. The load center 20 is normally supplied with electricity from an electric utility distribution grid (not shown) through a meter (not shown) and a conduit 24. Breaker switches 28 control electricity that is distributed within individual load circuits throughout the residence.

The residential load center 20 may also be supplied with electricity from an alternate source of electricity, such as a generator 32 (see FIG. 8). A generator 32 of sufficient capacity is installed near the residence. The generator 32 includes outlets (not shown) to distribute the electricity it generates.

A removable power cable 36 electrically connects the generator 32 to an inlet box 40 preferably mounted to a wall 44 on the outside of the residence. As shown in FIG. 9, the inlet box 40 includes a receptacle 48 to accept the power cable 36. The receptacle 48 is wired to a breaker switch 52 to control electricity through the inlet box 40. The breaker switch 52 has ON and OFF positions, and is designed to protect the generator from power surges. The breaker switch 52 includes output connectors 56 to provide electrical output for the inlet box 40.

The inlet box 40 is wired by way of a conduit 60 through a wall 62 of the residence to a junction box 64.

The junction box 64 allows access to wiring from the inlet box 40 contained in the conduit 60, and includes sufficient space to connect output wires. The junction box 64 is wired via a first flexible conduit 68 to a power transfer system 72.

The power transfer system 72 is preferably mounted on a wall 74 near the load center 20 inside the residence. Electrical input to the power transfer system 72 is supplied through the junction box 64, and electrical output from the power transfer system 72 supplies the load center 20 through a second flexible conduit 76. The wiring is described below in more detail.

As illustrated in FIG. 1, the power transfer system 72 includes a box 80, a mounting flange 84, and mounting holes 88. The power transfer system 72 also includes a power inlet 92 through which the first flexible conduit 68 is connected, and a power outlet comprising the second flexible conduit 76.

The power transfer system 72 also includes switches 100 mounted within the box 80. In the preferred embodiment, the switches 100 are conventional circuit breakers. In alternate embodiments, the switches 100 may be any other suitable switch design. Each switch 100 has an ON and an OFF position. In the illustrated embodiment, the switches 100 are divided into a first plurality of switches comprising ten generator-side switches 104 and a second plurality of switches comprising ten line-side switches 108. In an alternate embodiment, the transfer box includes six generator-side switches 104 and six line-side switches 108, or any other suitable number of switches.

Figure 10:
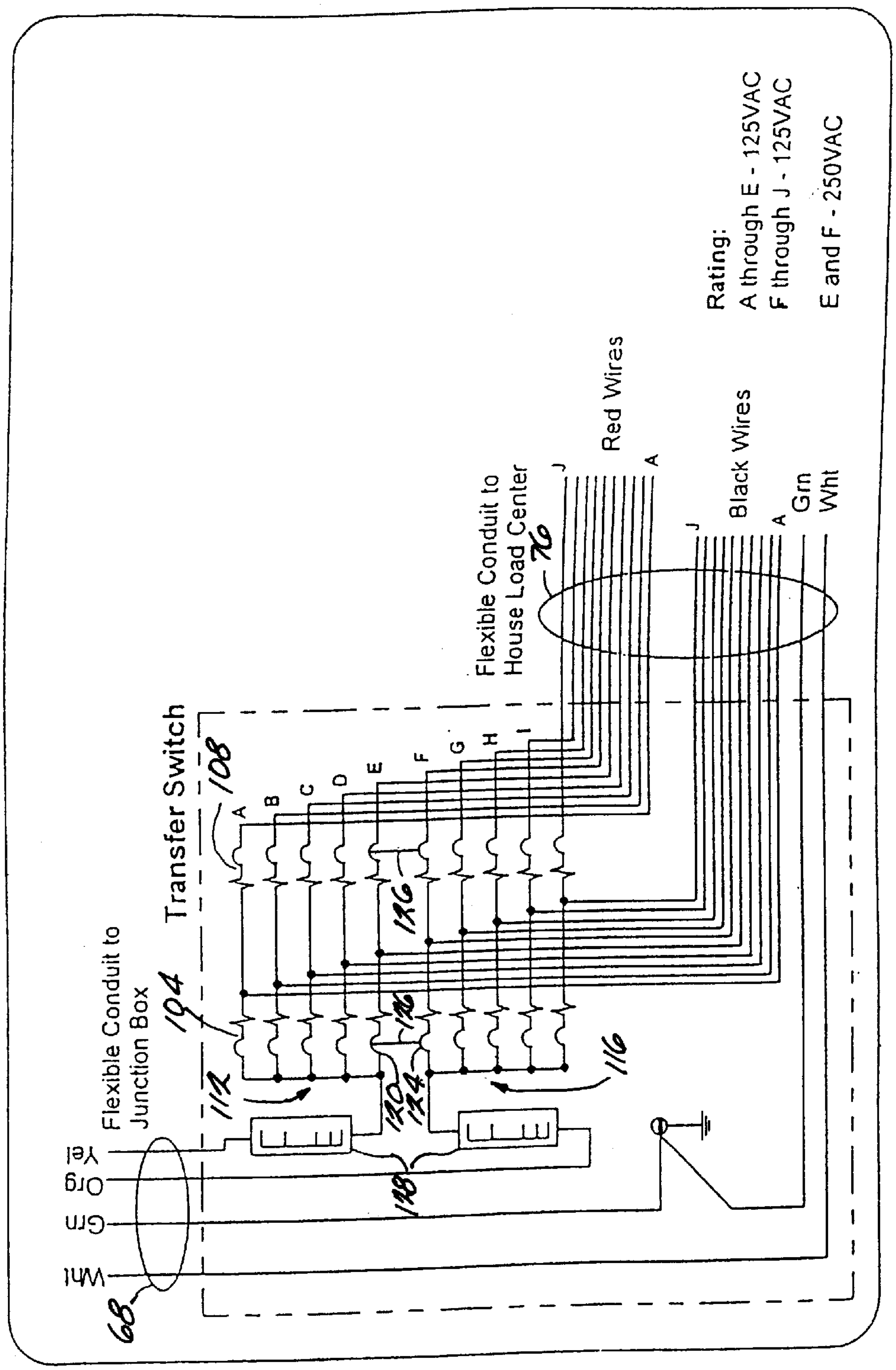
FIG. 10 is schematic diagram of the wiring in the transfer switch illustrated in FIG. 1.

As illustrated in FIG. 10, the input side of each generator-side switch 104 is wired to the junction box 64 through the first flexible conduit 68. The input side of each line-side switch 108 is wired through the second flexible conduit 76 and through the load center 20 to the line source of power. The outputs of the generator- and line-side switches 104, 108 are electrically connected to each other, then through the second flexible conduit 76 to the load center 20, and to a residential load to allow electricity to be supplied from either electrical source to the load.

The pluralities of generator-side and line-side switches 104, 108 are each divided into two power circuits. In the illustrated example, five of the generator-side switches 104 are grouped into a first power circuit 112, and the other five generator-side switches 104 are grouped into a second power circuit 116. One switch 120 in the first power circuit 112 is coupled to one switch 124 in the second power circuit 116. The switches 100 are designed to each carry 125 VAC, with the exception of the coupled pair of switches 120, 124 on each side that is designed to carry 250 VAC. The power transfer system 72 also includes shunts 126 that shunt current from the first power circuit 112 to the second power circuit 116 when the current in the first power circuit 112 reaches a predetermined level.

The power transfer system 72 also includes two watt meters 128, each connected to a generator-side power circuit 112, 116 to indicate the load on that power circuit.

Figure 5:
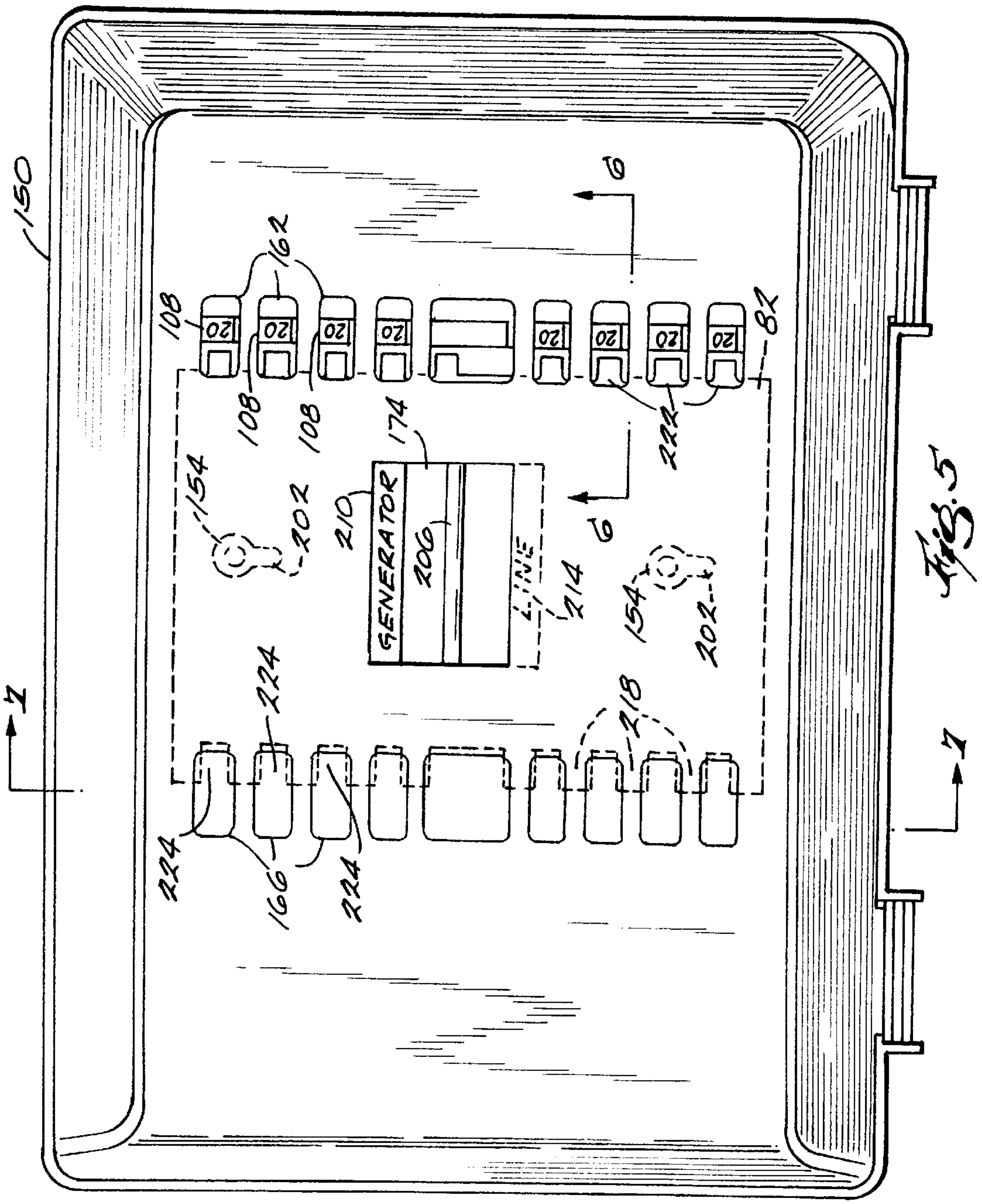
FIG. 5 is a partial plan view of the transfer switch illustrated in FIG. 1.
Figure 7:
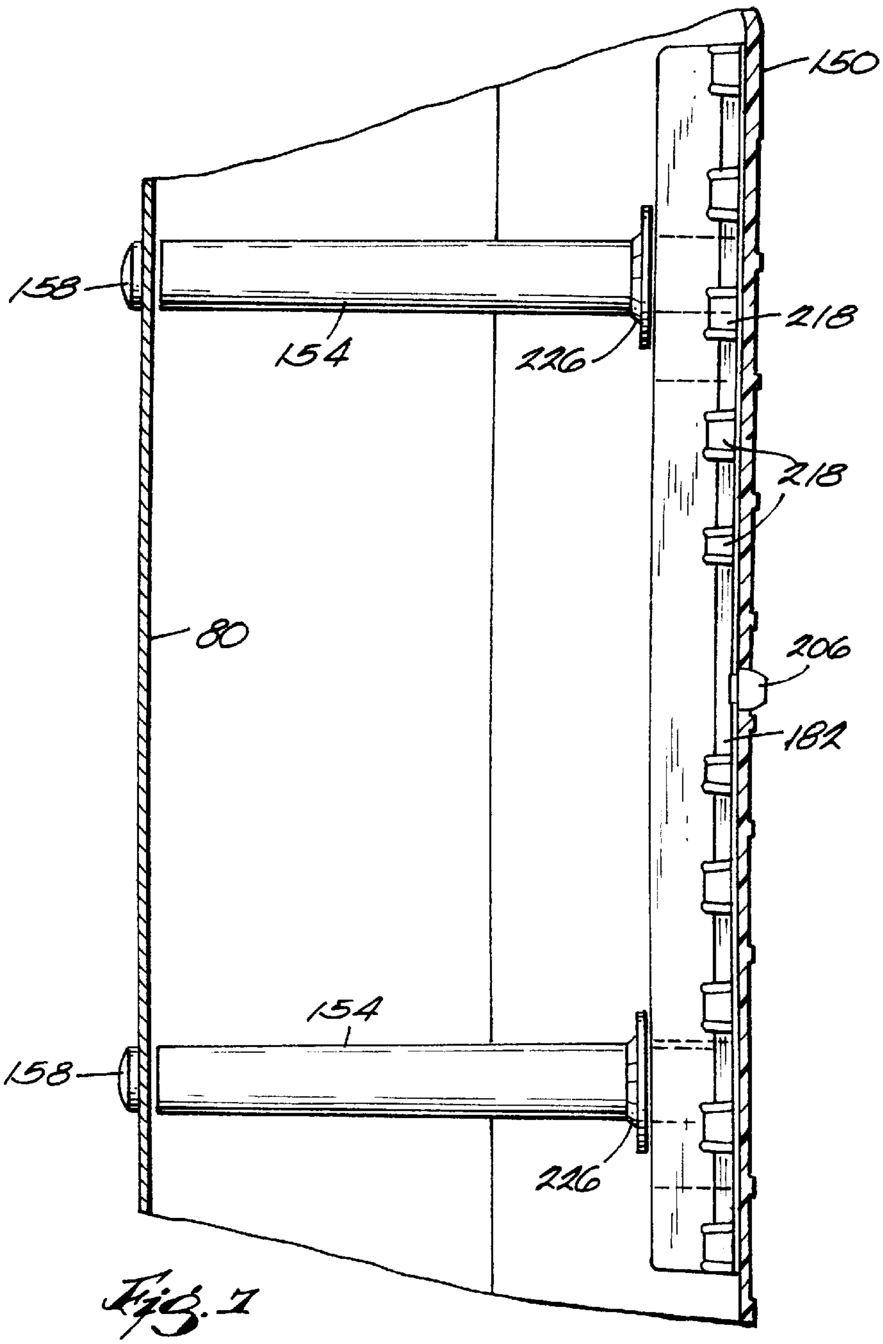
FIG. 7 is a cutaway elevation view taken along the 7—7 line of FIG. 5.

The power transfer system 72 also includes a face plate 150 (see FIG. 5). The face plate 150 has a back and a front and is mounted to the box 80 using a plurality of posts 154 and a plurality of screws 158 (see FIG. 7). As best shown in FIG. 5, the face plate 150 includes a plurality of apertures 162 to accommodate the line-side switches 108, a plurality of apertures 166 to accommodate the generator-side switches 104, and two apertures 170 to accommodate the meters 128 (see FIG. 1). The meter apertures 170 and the generator-side switches 104 are not shown in FIG. 5 for purposes of clarity. The face plate 150 also includes a central aperture 174.

Figure 6:
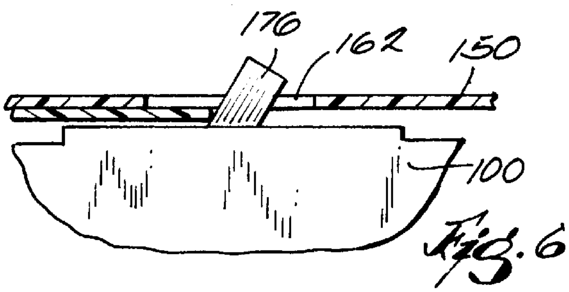
FIG. 6 is a partial elevation view of a switch extending partially through the lockout plate taken along the 6—6 line of FIG. 5.

As shown in FIG. 6, a switch 100 has a switch handle 176 that extends partially through an aperture 162 such that the majority of the switch 100 is located behind the face plate 150, but that the switch 100 can be manually operated from the front of the face plate 150.

The face plate 150 also includes a hinged cover 178 (see FIG. 1) to enclose the face plate 150. The hinged cover 178 is designed to protect the power transfer system 72 from intrusion by foreign matter and from tampering by unauthorized users. Each switch 100 cannot be manipulated when the hinged cover 178 is closed.

Figure 3:
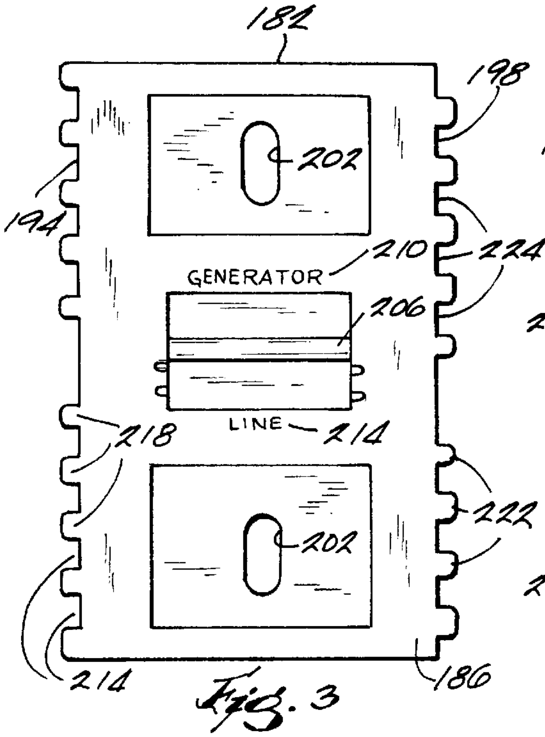
FIG. 3 is a plan view of the front of the lockout plate illustrated in FIG. 2.
Figure 4:
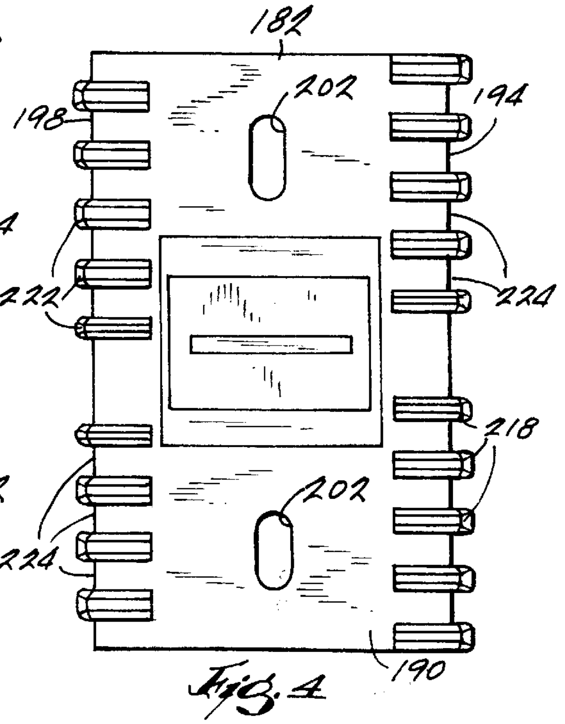
FIG. 4 is a plan view of the back of the lockout plate illustrated in FIG. 2.

The power transfer system 72 also includes a lockout plate 182 (see FIGS. 2–7) that is designed to prevent power from being supplied to the load center 20 by more than one power source. The lockout plate 182 has a front 186 illustrated in FIG. 3, a back 190 illustrated in FIG. 4, a first side 194, and a second side 198. The lockout plate 182 includes a pair of elongate apertures 202, a handle 206 that extends at least partially through the central aperture 174, and GENERATOR and LINE markings 210, 214 to indicate whether power is being supplied from the line or from the generator 32. Finally, the lockout plate 182 includes a first plurality 218 of tabs or fingers located on the first side 194 and a second plurality 222 of tabs or fingers located on the second side 198. A recess 224 is located between each pair of adjacent tabs. As best shown in FIG. 3, a tab on one side 194, 198 of the lockout plate 182 is always directly across from or parallel with a recess 224 on the other side 198, 194 of the lockout plate 182.

The lockout plate 182 is mounted to back of the face plate 150 (see FIGS. 5–7) such that a post 154 passes through each of the elongate apertures 202. The apertures 202 are sized to allow the lockout plate 182 to slide in a direction generally parallel to the face plate 150, between GENERATOR and LINE positions. The lockout plate 182 is held adjacent the back of the face plate 150 by a friction washer 226 mounted on each post 154. In addition, the lockout plate 182 cannot be manipulated when the hinged cover 178 is closed.

The pluralities of tabs 218, 222 on the first and second sides 194, 198 of the lockout plate 182 are arranged with various spacings such that the tabs 218, 222 mechanically impede movement of either the generator- or line-side switches 104, 108, depending on the position of the lockout plate 182. For example, when the lockout plate 182 is in the GENERATOR position as shown in FIG. 5, each of the line-side switches 108 is in its OFF position, and each tab of the second plurality of tabs 222 prevents a line-side switch 108 from moving out of the OFF position by physically blocking the switch 108 (see also FIG. 6). In this case, when a tab 222 is aligned with a line-side switch 108, a recess 224 is aligned with the generator-side switch 104 associated with that line-side switch 108, such that the generator-side switch 104 is not blocked by a tab. Thus, when each of the line-side switches 108 is blocked by a tab 222, each of the generator-side switches 104 is movable between its ON and OFF positions. Therefore, the lockout plate 182 does not prevent both the generator- and line-side switches 104, 108 from being simultaneously in their OFF positions, but it does prevent both the generator- and line-side switches 104, 108 from being simultaneously in their ON positions. This prevents power from being supplied to the load from more than one source of power at the same time.

Likewise, when the lockout plate 182 is in its LINE position (not shown), each of the generator-side switches 104 is in its OFF position, and each tab of the first plurality of tabs 218 prevents a generator-side switch 104 from moving out of its OFF position by physically blocking the switch 104.

For installation of the power supply assembly 10, the power transfer system 72 is mounted to a wall 74 adjacent the residential load center 20. With power to the load center 20 turned off at a main breaker (not shown), the second flexible conduit 76 is electrically connected to the load center 20, and the wiring from the power transfer system 72 to the load center 20 breakers and loads is completed, as illustrated in FIG. 10. The junction box 64 is mounted to a wall 74 preferably inside of the residence, and the inlet box 40 is mounted to a wall 44 preferably outside of the residence. The junction box 64 and the inlet box 40 are preferably mounted at similar vertical heights to simplify the installation of conduit between the boxes 40, 64. The first flexible conduit 68 from the power transfer system 72 is connected to the junction box 64, and a conduit 60 is connected between the junction box 64 and the inlet box 40. Wiring is completed within the junction box 64 and within the inlet box 40. Before power is restored to the load center 20, the generator-side switches 104 must be in their OFF positions, and the lockout plate 182 must be in its LINE position such that the generator-side switches 104 are blocked from movement out of their OFF positions. Power is restored to the residence by closing the main breaker and the line-side switches 108.

To place the alternate power source in operation in the event of a loss of line power or a test, starting from the as-installed condition, a generator 32 is positioned adjacent the inlet box 40 and prepared for operation (e.g., an adequate fuel supply is provided). The power cable 36 is plugged into both the generator outlet and the inlet box receptacle 48. The generator 32 is then operated to produce electricity. The inlet box circuit breaker must be in its ON position. Moving inside the residence, all of the line-side switches 108 are placed into their OFF positions. The lockout plate 182 is moved to its GENERATOR position, thus blocking the line-side switches 108 from moving out of their OFF positions. Selected generator-side switches 104 are then sequentially moved to their ON positions to supply power from the generator 32 to loads. Some or all of the generator-side switches may be turned ON, depending on the number and nature of the load circuits to which back-up power is to be supplied. Care must be taken to monitor the watt meters and to alternate the startups of heavy loads to maintain balanced loading within the power transfer system 72.

To return power source to utility power from generator power, each generator-side switch is placed in its OFF position. The lockout plate 182 is moved to its LINE position such that the generator-side switches 104 are blocked from movement out of their OFF positions. All line-side switches 108 are then moved to their ON positions, thus restoring power from the utility to the load center 20. The generator 32 is then shut off and the power cable 36 is disconnected from the generator 32 and the inlet box 40.

Various features of the invention are set forth in the following claims.

What is claimed is:

1. A power transfer system for supplying electrical power to a plurality of load circuits, the system comprising:

a first input adapted to being electrically connected to a power source;

a first plurality of switches electrically connected to the first input, wherein each first switch has an ON state and an OFF state;

a second input adapted to being electrically connected to the plurality of load circuits;

a second plurality of switches electrically connected to the second input, wherein each of the second switches is associated with one of said first switches and is adapted to being associated with one of the load circuits, and wherein each of the second switches has an ON state and an OFF state;

a face plate through which each switch of the first and second pluralities of switches at least partially extends; and a movable lockout plate, disposed behind the face plate and having a first position and second position, that prevents the movement of the first plurality of switches from their OFF states when the lockout plate is in the first position.

2. The system of claim 1, wherein the system includes a single lockout plate.

3. The system of claim 1, wherein the switch associated with said selected switch is movable between its ON and OFF states when the selected switch is prevented from moving from its OFF state.

4. The system of claim 1, wherein the lockout plate prevents movement of the second plurality of switches from their OFF states when the lockout plate is in the second position.

5. The system of claim 1, wherein the lockout plate includes a handle extending at least partially through an aperture in the face plate.

6. The system of claim 1, wherein the face plate has a back side, and wherein the lockout plate is slidably attached to the back side.

7. The system of claim 1, wherein the lockout plate includes an indicator that indicates when power is being supplied through the plurality of load circuits from the power source.

8. The system of claim 1, wherein the lockout plate includes an indicator that indicates when power is being supplied through the plurality of load circuits from a second source of power.

9. The system of claim 1, wherein the second plurality of switches is electrically connected to a second source of electrical power that includes a utility line.

10. The system of claim 1, wherein the lockout plate has first and second edges, and wherein the first and second edges each include a means to alternately mechanically impede movement of the first and second pluralities of switches, depending on a position of the lockout plate relative to the pluralities of switches.

11. The system of claim 10, wherein the means includes a plurality of tabs.

12. The system of claim 11, wherein the tabs are formed integrally with the lockout plate.

13. The system of claim 1, wherein the power source includes an electric generator.

14. The system of claim 13, wherein the first input is connectable to the generator through a junction box.

15. The system of claim 13, further comprising an inlet box, wherein the first input is connectable to the generator through the inlet box.

16. The system of claim 15, wherein the inlet box includes a circuit breaker.

17. The system of claim 15, wherein the inlet box includes a receptacle for removably connecting the generator to the inlet box.

18. The system of claim 1, wherein the transfer system includes an indicator to indicate the load on the first plurality of switches.

19. The system of claim 1, wherein the first and second pluralities of switches are each separated into first and second power circuits.

20. The system of claim 19, further comprising a shunt that shunts current from the first power circuit to the second power circuit when the current in the first power circuit reaches a predetermined level.

21. The system of claim 19, further comprising an indicator associated with each power circuit to indicate the load on that power circuit.

22. The system of claim 1, wherein the lockout plate moves in a linear direction.

23. The system of claim 1, wherein each of the first plurality of switches is independently movable, and wherein each of the second plurality of switches is independently movable.

24. A lockout mechanism for a power transfer system including first and second pluralities of switches having ON and OFF states, the mechanism comprising:

a lockout plate that prevents the movement of one of the first and second pluralities of switches from an OFF state to an ON state, and that allows each switch of the other plurality of switches to be independently switched between ON and OFF states.

25. The mechanism of claim 24, wherein the transfer system has a face plate, and wherein the lockout plate is slidably attached to the face plate.

26. The mechanism of claim 25, wherein the face plate has a back side, and wherein the lockout plate is slidably attached to the back side.

27. The mechanism of claim 24, wherein the lockout plate includes an indicator that indicates a source of power through the transfer system.

28. The mechanism of claim 24, wherein the lockout plate has first and second edges, and wherein the first and second edges each include a means to alternately mechanically impede movement of the first and second pluralities of switches, depending on a position of the plate relative to the pluralities of switches.

29. The system of claim 28, wherein the means includes a plurality of tabs.

30. The system of claim 29, wherein the tabs are formed integrally with the lockout plate.

* * * * *